Feb. 23, 1971 W. D. COLIANNI 3,565,732
PLATEN AND SLITTER MEANS FOR FORMING BUTTONHOLES
Filed Nov. 17, 1967 3 Sheets-Sheet 1

INVENTOR.
WILLIAM D. COLIANNI

BY *Greist, Lockwood, Greenawalt & Dewey*

ATTORNEYS.

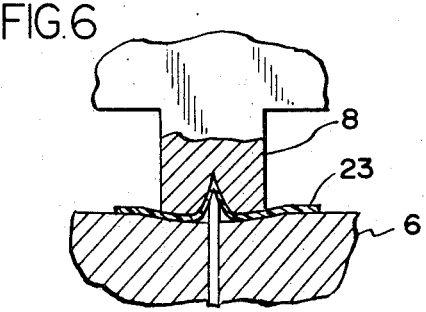
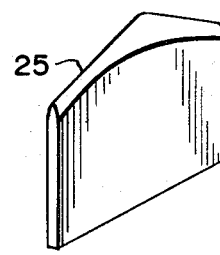
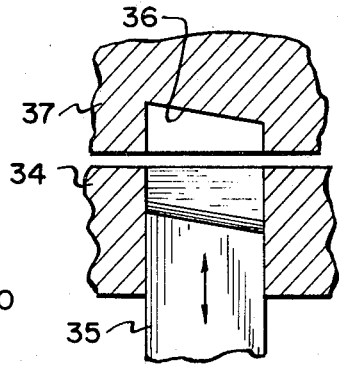
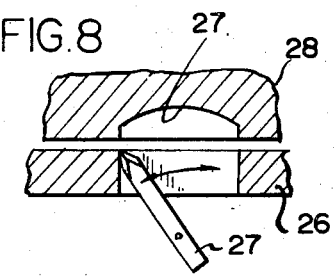
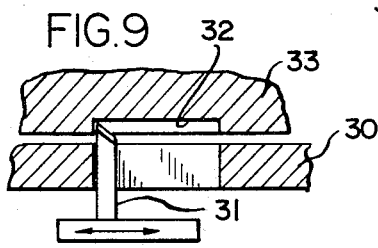
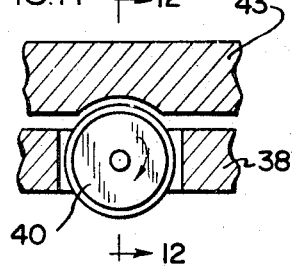
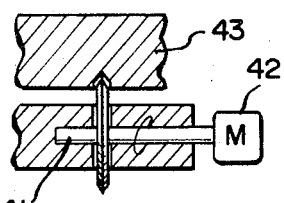
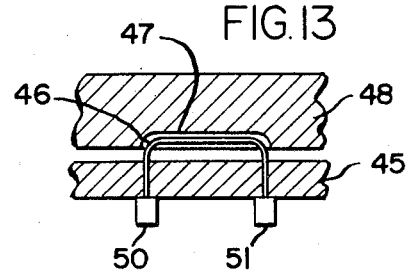
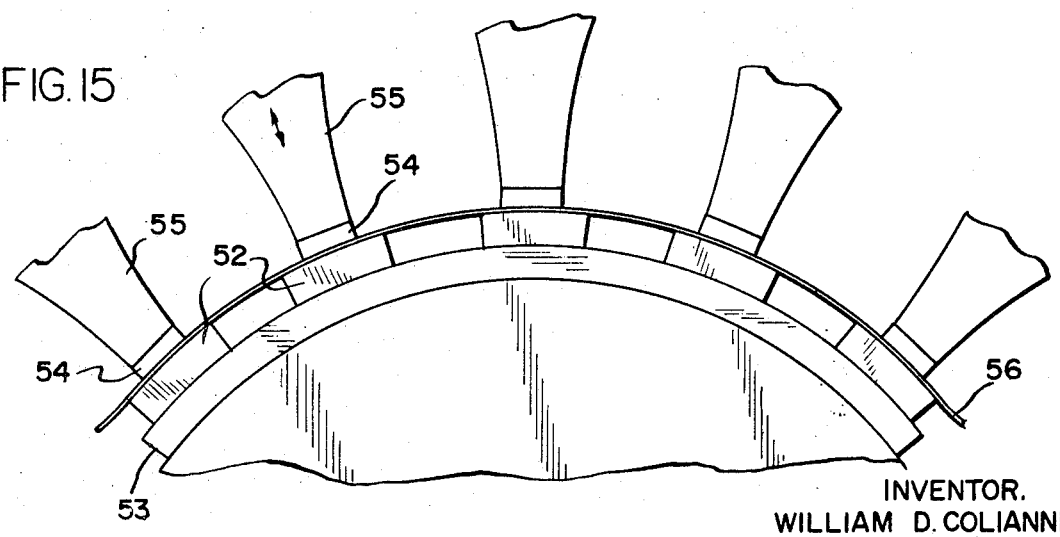

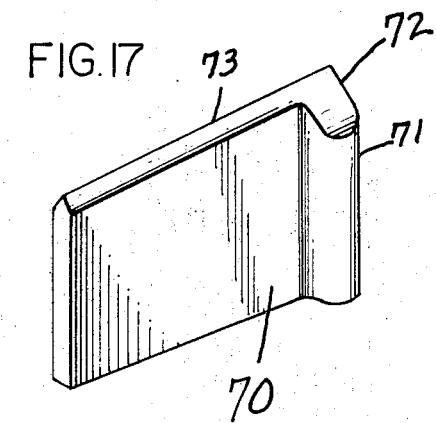
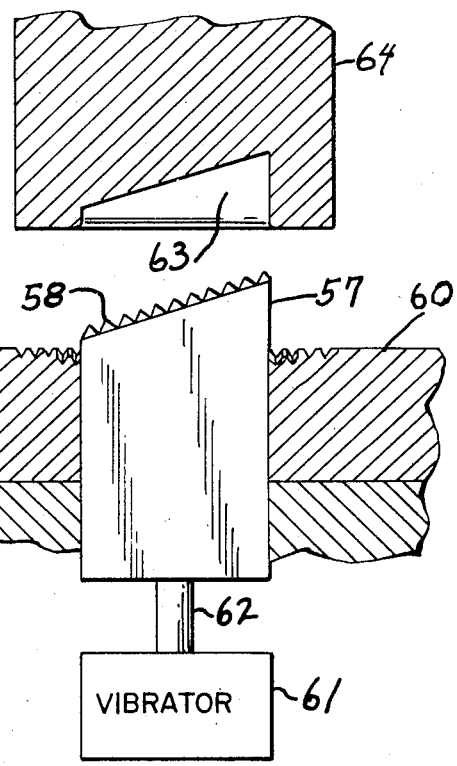
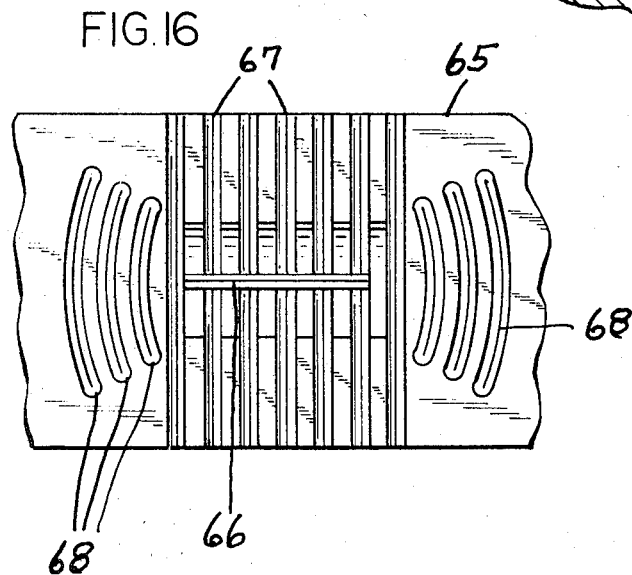

United States Patent Office 3,565,732
Patented Feb. 23, 1971

3,565,732
PLATEN AND SLITTER MEANS FOR FORMING BUTTONHOLES
William D. Colianni, 4179 W. Barry, Chicago, Ill. 60641
Filed Nov. 17, 1967, Ser. No. 683,934
Int. Cl. B29c 19/08; B32b 31/20
U.S. Cl. 156—513                                    16 Claims

ABSTRACT OF THE DISCLOSURE

Combined platen and slitter or cutting means for forming buttonholes in sheet or fabric material that is fusible when subjected to ultrasonic energy, dielectric energy or heat. The means comprises one or more pairs of male and female platen members having buttonhole outline areas which mate to compress sheet material therebetween. The male platen member has a material slitter or blade which either permanently protrudes through, or is actuated so as to protrude through, a slot opening within the platen buttonhole outline area. The female platen has a recess within its buttonhole outline area for receiving the cutting edge of the material slitter. When a pair of cooperating male and female platen members are brought together with sheet or fabric material compressed therebetween, a combined fusing and cutting action is performed which serves to form a completed buttonhole.

BACKGROUND OF THE INVENTION

The object of the invention, generally stated, is the provision of combined platen and slitting means of the above-mentioned type which may be used on devices operated by sonic, dielectric or thermal energy to quickly and economically form buttonholes, one or more at a time in sheet or fabric material which has fusible characteristics.

Certain more specific objects of the invention will, in part, be obvious and will in part appear hereinafter.

For a more complete understanding of the nature and scope of the invention reference may now be had to the following detailed description thereof taken in connection with the accompanying drawings, wherein:

FIG. 6 is a view similar to FIG. 2 but with the platen members mated together and a sheet of material pressed therebetween and having a buttonhole formed therein;

FIG. 7 is a perspective view of an alternate form of material slitter or blade that may be mounted in the lower or male platen member of the combination shown in FIGS. 1–6;

FIG. 8 is a diagrammatic view illustrating a material slitter which is in the form of a needle having cutting edges on its point and mounted for swinging or pendulum action in a slot in a lower male platen member;

FIG. 9 is a diagrammatic view similar to FIG. 8 showing a material slitter in the form of a needle having a cutting edge on the point and mounted for reciprocating action in the slot provided in a male platen member;

FIG. 10 is a diagrammatic view similar to FIG. 8 showing a material slitter or blade arranged to be reciprocated vertically in the slot of a male platen member;

FIG. 11 is a diagrammatic view similar to FIG. 10 showing a rotating circular knife mounted in the slot of a male platen member;

FIG. 12 is a diagrammatic view taken on line 12—12 of FIG. 11 and illustrating the electric motor drive for the rotating blade;

FIG. 13 is a diagrammatic view similar to FIG. 8 showing a material slitter in the form of an electrically heated wire mounted on a male platen member;

FIG. 14 is a view similar to FIG. 3 showing a modification;

FIG. 15 is a diagrammatic view of a preferred arrangement for simultaneously forming a plurality of buttonholes;

FIG. 16 is a view similar to FIG. 5 but showing a modification; and

FIG. 17 is a perspective view of a modified form of material slitter or blade.

Figure 1:
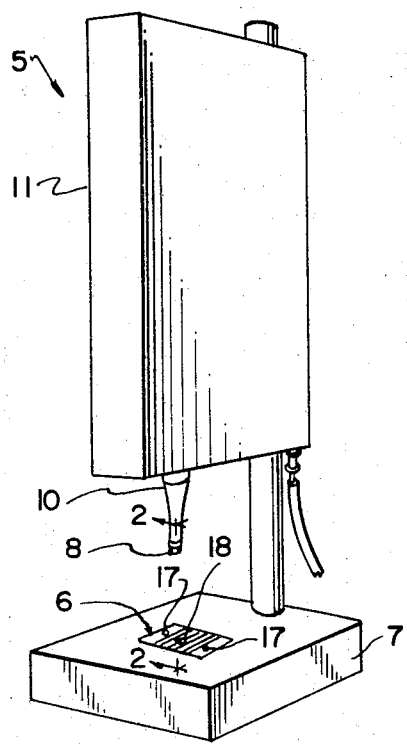
FIG. 1 is a perspective view of one type of apparatus with which combined platen and slitting means of the present invention may be used for forming buttonholes one at a time in fusible sheet material.

Referring to FIG. 1, an apparatus is indicated generally at 5 therein which may be used with the platen and slitter means of the present invention for forming buttonholes one at a time in fusible sheet material. The apparatus 5 is of known type except for a male platen member 6 secured in a recess in the base 7 and a female platen member 8 carried on the lower end of a vertically reciprocable stem 10.

Mounted within the housing 11 of the apparatus 5 is a two-way hydraulic or pneumatic cylinder for vertically reciprocating the stem 10 down to and up from the base 7 and an ultrasonic energy generator of known type for imparting ultrasonic vibrations to the stem 10. It will be understood that the apparatus 5 is of known type except for the male and female platen members 6 and 8, respectively, which constitute one embodiment of the present invention. One suitable commercial piece of equipment for use as the apparatus 5 is the Model 220 ultrasonic assembly stand available from Branson Instruments, Inc., of Stamford, Conn. Similar equipment is available from other sources e.g. the Sonocone Unit, Powertron Division, Giannini Controls Corp., New York, N.Y.

Figure 2:
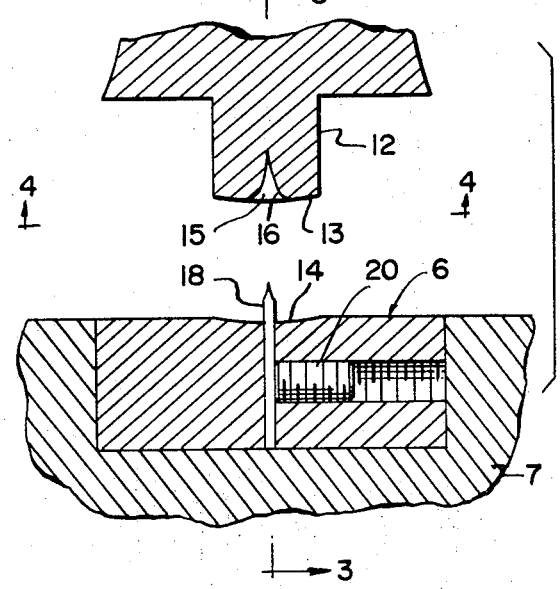
FIG. 2 is an enlarged fragmentary sectional view taken on line 2—2 of FIG. 1 showing the mating platen means and associated slitter or knife, constituting one embodiment of the invention.
Figure 4:
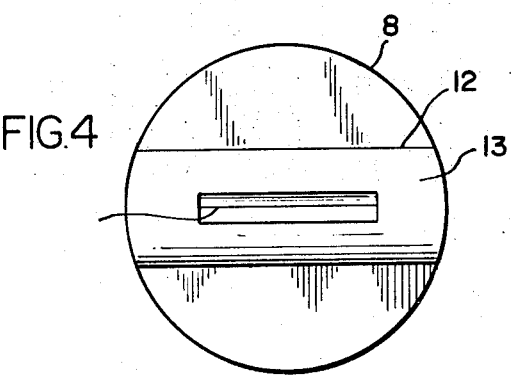
FIG. 4 is a bottom plan view of the upper or female platen member taken on line 4—4 of FIG. 2.
Figure 3:
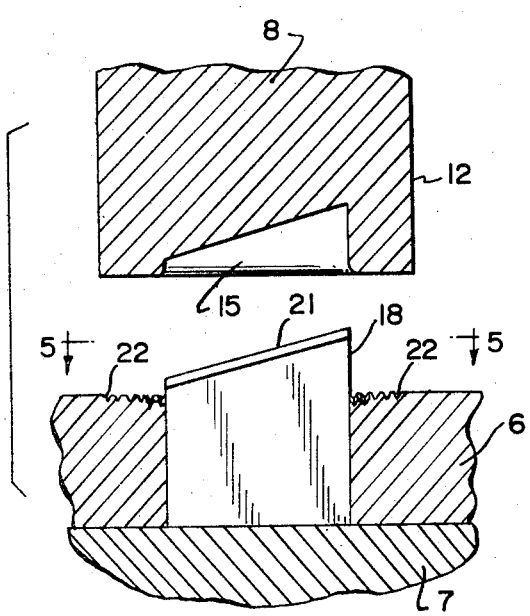
FIG. 3 is a sectional view taken on line 3—3 of FIG. 2.
Figure 5:
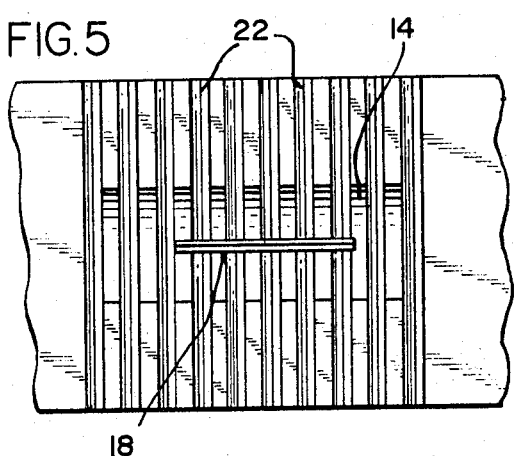
FIG. 5 is a top plan view of the buttonhole outline area and material slitter of the lower or male platen member taken on line 5—5 of FIG. 3.

As will be seen from FIGS. 2, 3 and 4, the female platen member 8 which is suitably secured to the lower end of the stem 10, has a transverse tip portion 12 having two flat parallel vertical sides with rounded opposite ends conforming to the curvature of the main portion of the platen member. The bottom end of the tip portion 12 is slightly convex as indicated at 13 and the bottom convex surface 13 constitutes a buttonhole outline pressure area which is cooperable with the mating concave button-hole outline pressure area 14 of the stationary bottom male platen member 6.

Within the confines of the buttonhole outline pressure area 13 the tip 12 is provided with a slitter edge receiving recess 15 which is tapered upwardly toward one side in one direction as shown in FIG. 3, and which has a generally inverted V-shape in cross-section as shown in FIG. 2. Preferably, the bottom edges of the recess 15 are outwardly curved or flared as indicated at 16 in FIG. 2 for a purpose which will be further described in connection with FIG. 6.

The male platen member 6 is in the form of a block which is rectangular in cross-section so that it may be set into a correspondingly shaped recess in the base 7 of the apparatus 5 and suitably secured therein as by two hold-down screws 17—17. The platen member 6 is provided with a transversely extending slot which receives a slitter blade 18. The blade 18 may be secured in place in the slot and adjusted to the proper height bp means of a set screw 20. The protruding cutting edge 21 of the blade or slitter 18 is upwardly inclined toward one side and is oriented with the slitter edge recess 15 in the female platen member 12.

A plurality of grooves 22—22 are milled into the surface of the platen 6 and extend in a direction transversely to the blade 18. The purpose of the grooves 22 is to assist in the retention of the fabric between the mating buttonhole outline pressure areas 13 and 14 and prevent individual filaments from being distorted. The mating radius on each of the buttonhole outline pressure areas 13 and 14 also assist in this action.

The action of the platen members 6 and 8 and the slitter or blade 18 in forming a buttonhole in a piece of sheet material 23 is illustrated in FIG. 6. The sheet material 23 may be any fusible material including either a woven textile materal composed of synthetic filaments or fibers which are fusible or coated with a fusible material (e.g. a piece of nylon, polyacrylate (Orlon) or polyester fabric) or a sheet of plastic material such as polyvinyl chloride or any other fusible material in which it is desired to form a buttonhole. In operation, the sheet material 23 (usually two thicknesses) is laid over the male platen 6 so that the area in the sheet material in which it is desired to form the buttonhole registers with the buttonhole outline pressure area 14. The apparatus 5 is then actuated to lower the stem 10 and press the female platen 12 down onto the top of the fabric as shown in FIG. 6. The ultrasonic generator is actuated so as to energize the stem 10 and impart ultrasonic vibrations to the female platen member 8 thereby producing a fusing action of the material pressed between the areas 13 and 14.

It will be seen that as the female platen member 8 is lowered, the protruding knife edge 21 of the slitter 18 will enter into the recess 15. The upper right-hand edge of the slitter (as viewed in FIG. 3) pierces the material 23 first and then the cutting edge progressively cuts the same as the platen members close together. It will be seen from FIG. 6 that the shape of the recess 15 in the female platen member 8 is such that the cut edges of the sheet material 23 are allowed to fold up slightly into the recess. When the platen members are pressed together, the ultrasonic energy serves to fuse the sheet material which is compressed between the buttonhole outline pressure areas 13 and 14 thereby permanently establishing the outline of the buttonhole in the material 23.

It will be understood by those skilled in the art that in place of using ultrasonic energy for obtaining the fusing action that one or both of the platen members may be heated so as to impart the fusing action and when the sheet material has appropriate dielectric properties, high frequency energy may be imparted in known manner to the material pressed between the buttonhole outline pressure areas 13 and 14 to produce a fusing action.

In FIG. 7, a slitter blade 24 is shown which may be used to replace the slitter 18 in the male platen member 6. The blade 24 has a V-shaped knife edge 25.

In FIG. 8 the male platen member 26 is shown having a slitter-receiving slot in which a needle 27 having a cutting edge on its point is arranged to swing from side to side as indicated. The recess 27 in the female platen member 28 has a conforming arcuate configuration for accommodating the swinging action of the pointed knife 27.

In FIG. 9, a male platen member 30 has a needle 31 mounted for reciprocating action in the slot with the point of the needle 31 projecting into the recess 32 of the female platen member 33.

In FIG. 10 the male platen member 34 is provided with a vertically reciprocating slitter or blade 35 which is adapted to project into the recess 36 in the female platen member 37.

In FIGS. 11 and 12 the male platen member 38 is provided with a rotating knife blade 40 which is mounted on a spindle or shaft 41 driven by an electric motor 42. A conforming arcuate recess is provide in the female platen member 43 for accommodating the protruding arcuate surface of the rotating knife 40.

In the embodiment shown in FIG. 13, the male platen member 44 is provided with a slitter in the form of a corresponding recess 47 in the female platen member 48. The terminals 50 and 51 of the resistance wire 46 may be connected in known manner to a suitable source of electrical energization.

In production, it will often be desired to form a plurality of buttonholes in one operation such as in a shirt or blouse. In FIG. 15, an apparatus is shown which is particularly adapted to this type of operation. A plurality of male platen members 52—52 are mounted on the exterior or convex surface of a curved or arcuate support member 53. The cooperating female platen members 54—54 are mounted on the ends of reciprocating stem elements 55—55 which extend in a normal direction to the male platen members 52. Fabric or sheet material to have buttonholes formed therein is indicated at 56. This particular arrangement permits the male platen members to be closely placed together while providing adequate spacing for the ultrasonic generators required to actuate the stems 55 and associated apparatus.

In FIG. 14 a modification is shown wherein a material slitter or blade 57 having a saw tooth cutting edge 58 is mounted for vibration in a vertical direction in a platen 60. The blade is vibrated by an electrically energized vibrator 61 of known type to which the blade is connected by a rod 62. The inclined saw tooth edge 58 cooperates with a mating recess 63 in an ultrasonically actuated tip 64.

In FIG. 16 a modified buttonhole outline area is shown in a male platen member 65 carrying a slitter or cutter blade 66. The outline has straight parallel grooves 67—67 and at the ends arcuate grooves 68—68 which impart a more attractive appearance to the buttonholes.

When it is desired to form buttonholes with an enlargement at one end a blade may be used such as blade 70 shown in FIG. 17. The blade 70 has an enlargement 71 at one end which provides a widened cutting edge portion 72. This widened edge portion 72 serves to form an enlargement at one end of the slit formed by the narrow cutting edge 73.

It will be apparent that certain further changes may be made in the foregoing embodiments without departing from the spirit or scope of the invention. For example, in the embodiment shown in FIGS. 1–6, the blade 18 could be mounted in the upper platen member 8; the surface 13 may be concave and the surface 14 convex; and the milled grooves 22 may be formed in the surface 13.

What is claimed as new is:

1. Means for forming buttonholes in sheet or fabric material which is fusible when subjected to sonic energy, dielectric energy or heat which comprises, a first platen member having a first buttonhole outline pressure area, a second platen member having a second buttonhole outline pressure area matable with said first buttonhole outline pressure area for compressing sheet material between said areas, a material slitter mounted on one of said platen members for slitting material compressed between said areas, the platen member not carrying said slitter having a slit recess within its buttonhole outline area for receiving the slitting edge of said slitter, one of said buttonhole outline pressure areas being concave and the other being convex.

2. The means called for in claim 1 wherein at least one of said buttonhole outline pressure areas has grooves formed therein for said material to be pressed into.

3. The means called for in claim 2 wherein said grooves comprise an intermediate group of parallel grooves extending transversely to said slitter and groups of arcuate grooves at opposite ends of said group of parallel grooves.

4. The means called for in claim 1 wherein said slit recess is V-shaped in cross-section with the opposing entrance edges being outwardly flared.

5. Means for forming buttonholes in sheet or fabric material which is fusible when subjected to sonic energy, dielectric energy, or heat which comprises, a first platen member having a concave buttonhole outline pressure area and having a slitter receiving slot therein within said area, a second platen member having a convex buttonhole outline pressure area for compressing sheet material between said areas, and a material slitter mounted in said slitter receiving slot, said second platen member having a slit recess therein in mating alignment with said slitter receiving slot for receivng the slitting edge of said slitter.

6. The means called for in claim 5 wherein said material slitter is a blade fixed in said slitter receiving slot and having a slitter edge protruding from said first platen member.

7. The means called for in claim 5 wherein said slit recess in said second platen member is generally V-shaped in cross-section with the opposing entrance edges outwardly flared.

8. The means called for in claim 5 wherein said material slitter is a needle member with a cutting edge on the protruding point, said needle member being mounted for swinging between opposite ends of said slitter receiving slot.

9. The means called for in claim 5 wherein said material slitter is a needle member with a cutting edge on the protruding point, said needle member being mounted for reciprocation between opposite ends of said slitter receiving slot.

10. The means called for in claim 5 wherein said material slitter is a blade mounted for reciprocating action into and out of said slit recess in said second platen member when said platen members are closed together.

11. The means called for in claim 5 wherein said material slitter is a blade having a saw tooth cutting edge mounted for vibratory action, a vibrator, and means connecting said blade to said vibrator.

12. The means called for in claim 5 wherein said material slitter is a circular blade rotatably mounted in said slitter receiving slot.

13. The means called for in claim 12 wherein said circular blade is connected in driving relationship with a driving motor.

14. The means called for in claim 5 wherein said material slitter is a resistance wire adapted to be energized by a source of electrical current.

15. The means called for in claim 5 wherein said material slitter has a narrow elongated material cutting edge with an enlarged cutting portion at one end thereof.

16. Apparatus for forming a plurality of buttonholes in sheet or fabric material which is fusible when subjected to sonic energy, dielectric energy or heat which comprises a curved support member, a plurality of first platen members disposed on the convex side of said curved support member each of said members having a first buttonhole outline pressure area, a plurality of second platen members each having a second buttonhole outline pressure area matable with one of said first buttonhole outline pressure areas for compressing sheet material between said areas, elongated mounting means for said second platen members with the longitudinal axis of said mounting means extending generally normal to said convex side of said curved support member, means for closing and opening said first and second platen members, a material slitter mounted on each platen member in one of said two sets thereof for slitting sheet material compressed between each pair of said mating areas, and each platen member in the other of said two sets thereof having a slit recess within its buttonhole outline area for receiving the slitting edge of the material slitter mounted on its associated platen member.

References Cited

UNITED STATES PATENTS

| 760,865 | 5/1904 | Hogan | 83—905X |
| 1,071,445 | 8/1913 | Levin | 83—905X |
| 1,289,759 | 12/1918 | Henschel | 83—905X |
| 1,914,528 | 6/1933 | Reid | 83—676X |
| 2,244,550 | 6/1941 | Chandler | 156—513X |
| 3,156,010 | 11/1964 | Osborn | 156—515 |
| 3,263,290 | 8/1966 | Eguchi et al. | 112—264UX |
| 3,385,149 | 5/1968 | Johnson | 83—456X |
| 3,423,271 | 1/1969 | Kallert et al. | 156—513X |

BENJAMIN A. BORCHELT, Primary Examiner

J. M. HANLEY, Assistant Examiner

U.S. Cl. X.R.

156—380, 515; 83—905; 112—68